(12) United States Patent
Tanaka et al.

(10) Patent No.: US 7,756,411 B2
(45) Date of Patent: Jul. 13, 2010

(54) PHOTOGRAPHING APPARATUS AND METHOD

(75) Inventors: Toshiyuki Tanaka, Yokohama (JP); Toshihiro Hamamura, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 11/728,994

(22) Filed: Mar. 28, 2007

(65) Prior Publication Data

US 2007/0230939 A1    Oct. 4, 2007

(30) Foreign Application Priority Data

Apr. 3, 2006    (JP) ............................. 2006-101424

(51) Int. Cl.
G03B 15/03    (2006.01)
(52) U.S. Cl. ..................... 396/155; 348/297; 348/371
(58) Field of Classification Search ................. 396/155; 348/208.1, 208.12, 221.1, 297, 366, 371
See application file for complete search history.

(56) References Cited

U.S. PATENT DOCUMENTS

| | | | | |
|---|---|---|---|---|
| 5,027,215 A | * | 6/1991 | Takayama et al. | 348/314 |
| 5,532,738 A | * | 7/1996 | Stern | 348/61 |
| 5,959,668 A | * | 9/1999 | Cryder et al. | 348/229.1 |
| 6,185,374 B1 | * | 2/2001 | Yamaguchi et al. | 396/61 |
| 6,195,127 B1 | * | 2/2001 | Sugimoto | 348/370 |
| 6,441,856 B1 | * | 8/2002 | Sugimoto | 348/371 |
| 7,319,423 B2 | * | 1/2008 | Augusto et al. | 341/155 |
| 7,386,228 B2 | * | 6/2008 | Okada | 396/238 |
| 7,426,341 B2 | * | 9/2008 | Misawa | 396/226 |
| 7,493,030 B2 | * | 2/2009 | Kakkori | 396/65 |
| 2005/0057674 A1 | * | 3/2005 | Krymski et al. | 348/296 |
| 2005/0128310 A1 | * | 6/2005 | Egawa | 348/208.12 |
| 2006/0062557 A1 | * | 3/2006 | Imada | 396/55 |
| 2006/0157760 A1 | * | 7/2006 | Hayashi et al. | 257/293 |
| 2006/0269261 A1 | * | 11/2006 | Wernersson | 396/55 |
| 2007/0125951 A1 | * | 6/2007 | Snider et al. | 250/363.03 |
| 2007/0147824 A1 | * | 6/2007 | Hamamura | 396/213 |

FOREIGN PATENT DOCUMENTS

JP    2005-086488 A    3/2005

* cited by examiner

Primary Examiner—Melissa J Koval
Assistant Examiner—Linda B Smith
(74) Attorney, Agent, or Firm—Drinker Biddle & Reath LLP (57) ABSTRACT

A photographing apparatus and method that can combine a plurality of images photographed by time division exposure. The photographing apparatus and method employ a photographing device having an entire reset mode in which entire pixels are exposed simultaneously right after a flash is shot, and a sequential exposure mode in which exposure time is different according to a state where a flash is not shot, and an image combining unit that combines images photographed by the photographing device, such that the photographing device performs photographing in combination of the entire reset mode and the sequential exposure mode in sequential photographing operations.

20 Claims, 8 Drawing Sheets

PHOTOGRAPHING APPARATUS AND METHOD

CROSS-REFERENCE TO RELATED PATENT APPLICATION

This application claims the benefit of Japanese Patent Application No. 2006-101424, filed on Apr. 3, 2006, in the Japan Patent Office, the disclosure of which is incorporated herein in its entirety by reference.

BACKGROUND OF THE INVENTION

1. Field of the Invention

The present invention relates to a photographing apparatus and a method for photographing, and more particularly, to a photographing apparatus and a method that corrects for an adverse affect caused by -shaking when photographing a low brightness scene.

2. Description of the Related Art

Conventional techniques exist for correcting errors in photographed images caused by shaking of the photographing apparatus, such as a camera. For example, an optical shaking correction method exists that corrects errors in an image caused by shaking by shifting a position of the lens of a photographing apparatus with respect to a photographing surface in a direction opposite to the shaking direction.

Also, in the conventional shaking correction technique disclosed in Japanese Patent Publication No. 2005-086488, after a plurality of images are photographed using a high speed shutter, each of the images are combined on the basis of a particular point of an object in order to correct the image.

In a photographing device that performs a rolling readout, such as a complementary metal oxide semiconductor (CMOS), the exposure timing in each vertical line is different. Accordingly, to uniformly expose the upper and lower parts of the photographing device to light, the overall vertical line must be exposed at the same time. To do this, a low speed shutter may be used, or a mechanical shutter is closed after the charges on the overall line are entirely reset and a flash photograph is taken. However, when focusing to a distant object, the selection of a low speed shutter may not be desirable since shaking due to hand movement, for example, can easily occur. Also, the distortion of a focal plane may introduce further errors in the image.

The method in which the entire line is reset and the mechanical shutter are used together is suitable for photographing an object in the foreground, such as a face. However, when photographing a background in a slow synchronized photographing mode with a shaking correction function, the total exposure time is long and the sound that the apparatus makes during photographing can be unpleasant to the photographer.

SUMMARY OF THE INVENTION

The present invention provides a photographing apparatus and method that provides a shaking correction function that is suitable, in particular, when photographing a low brightness scene.

An embodiment of the present invention provides a photographing apparatus that can combine a plurality of images photographed by time division exposure. The apparatus can comprise, for example, a photographing device having an entire reset mode in which the entirety of pixels are exposed simultaneously right after a flash is shot, and a sequential exposure mode in which exposure timing is different according to a state where a flash is not shot. The apparatus can further comprise an image combining unit that combines images photographed by the photographing device, such that the photographing device performs photographing in combination of the entire reset mode and the sequential exposure mode in sequential photographing operations.

The photographing device may photograph the plurality of images through a plurality of exposures by the sequential exposure mode in sequential photographing operations, and the image combining unit may combine the plurality of images by removing the dislocation of an object included in the plurality of images. Also, the image combining unit may generate a combined image whenever an image is photographed by the photographing device by combining the image photographed by the photographing device. The photographing apparatus may further comprise an exposure amount detecting unit that detects the exposure amount of the combined image, and the photographing device may stop photographing in the sequential exposure mode when the exposure amount of the combined image reaches a predetermined brightness level.

Also, the photographing device may repeat photographing in the sequential exposure mode until a photographer stops photographing, and since the exposure amount can be manually adjusted, the photographer may control a suitable exposure amount.

Another embodiment of the present invention provides a method of photographing in which a plurality of images photographed by time division exposure can be combined. The method comprises the steps of performing a composite mode photographing process using an entire reset mode in which the entirety of pixels are exposed simultaneously right after a flash is shot, and a sequential exposure mode in which exposure timing is different according to a state where a flash is not shot. The method can further includes the step of performing an image combining process in which images photographed in the composite mode photographing process are combined. In the composite mode photographing process, photographing is performed in combination of the entire reset mode and the sequential exposure mode in sequential photographing operations.

In the composite mode photographing process, a plurality of images may be photographed through a plurality of exposures by the sequential exposure mode in sequential photographing operations, and in the image combining process, the plurality of images may be combined by removing dislocations of an object included in the plurality of images. Furthermore, in the image combining process, a combined image may be generated whenever an image is photographed by the photographing device by combining the photographed image.

The method of photographing may further comprise an exposure amount detecting process in which the exposure amount of the combined image is detected, and in the composite mode photographing process, photographing may stop in the sequential exposure mode when the exposure amount of the combined image reaches a predetermined brightness level. In the composite mode photographing process, the photographing in the sequential exposure mode may be repeated until a photographer stops photographing, and because the exposure amount can be manually controlled, the photographer may control a suitable exposure amount.

In addition, according to an embodiment of the present invention, the photographing apparatus may include a photographing device in which charges of every pixel that has received light according to intensity of light are accumulated, and a sequential exposure photographing unit that photographs a plurality of images by a time division exposure in a rolling shutter mode in which charges are readout in a direction from a position where the exposure begun after an exposure begins in a direction on every row of the photographing device and a predetermined exposure time has elapsed. The photographing apparatus may further include an entire reset unit that entirely removes all charges accumulated in each pixel of the photographing device, a mechanical shutter that controls a shielding state and an exposure state by opening and closing a shielding plate that shields light incident to the photographing device, and a flash control unit that lights a flash simultaneously as the mechanical shutter is opened. The photographing apparatus may also include an entire exposure photographing unit that photographs an image in a global shutter mode in which accumulated charges in each of the pixels of the photographing device are readout at the same time that the exposure ends after a predetermined exposure time by opening the mechanical shutter so that all the pixels of the photographing device can be simultaneously exposed right after the charges accumulated in the photographing device are removed by the entire reset unit. The photographing apparatus further may include a first feature point extracting unit that extracts a first feature point based on edge information of an entire exposure image, a second feature point extracting unit extracts a second feature point based on edge information of a sequential exposure image, and an image combining unit that generates a combined image by combining an entire exposure image and a sequential exposure image so that a position of the first feature point extracting unit and a position of the second feature point extracting unit are aligned.

In this arrangement, the rolling shutter mode is a practical example of the sequential exposure mode, and the global shutter mode is a practical example of the entire exposure mode. Also, power consumption may be reduced by jointly using the rolling shutter mode. As a result, the consumption of battery may be reduced although the photographing shots are increased by the time division exposure.

The photographing apparatus may further include a main object brightness detecting unit that detects the brightness of a main object of the combined image, and an optimum brightness determining unit that determines the appropriateness of brightness of the main object in the combined image by comparing the detected brightness of the main object with a predetermined appropriate brightness. The photographing apparatus also may include a photographing control unit that controls the sequential exposure photographing unit to photograph a further sequential exposure image when it is determined that the brightness of the main object is not appropriate, and controls the image combining unit to combine another image by combining a combined image and the one of the photographed sequential exposure images.

The photographing apparatus may also include a background brightness detecting unit that detects brightness of a background of the combined image, and an optimum background brightness determining unit that determines the appropriateness of brightness of the background in the combined image by comparing the detected brightness of the background with a predetermined appropriate background brightness. The photographing apparatus may further include a photographing control unit that controls the sequential exposure photographing unit to photograph a further sequential exposure image when it is determined that the brightness of the main object is not appropriate and the brightness of the back ground is not appropriate, and controls the image combining unit to combine another image by combining a combined image and the one further photographed sequential exposure image.

In this arrangement, the photographing control unit may control the sequential exposure photographing unit to continue photographing exposure images when a shutter button is pressed more than a predetermined time, for example, until a shutter button is released. As another example, if the shutter button is pressed twice, the photographing control unit may be configured to cease the sequential exposure. Also, the photographing control unit may include a display unit to display an exposure level of a combined image in the display unit whenever a sequential exposure image is photographed and a combined image is generated.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE EMBODIMENTS

The present invention will now be described more fully with reference to the accompanying drawings in which exemplary embodiments of the invention are shown. In the following detailed description and the accompanying drawings, like reference numerals are used to elements that have substantially the same configuration and function.

Figure 1:
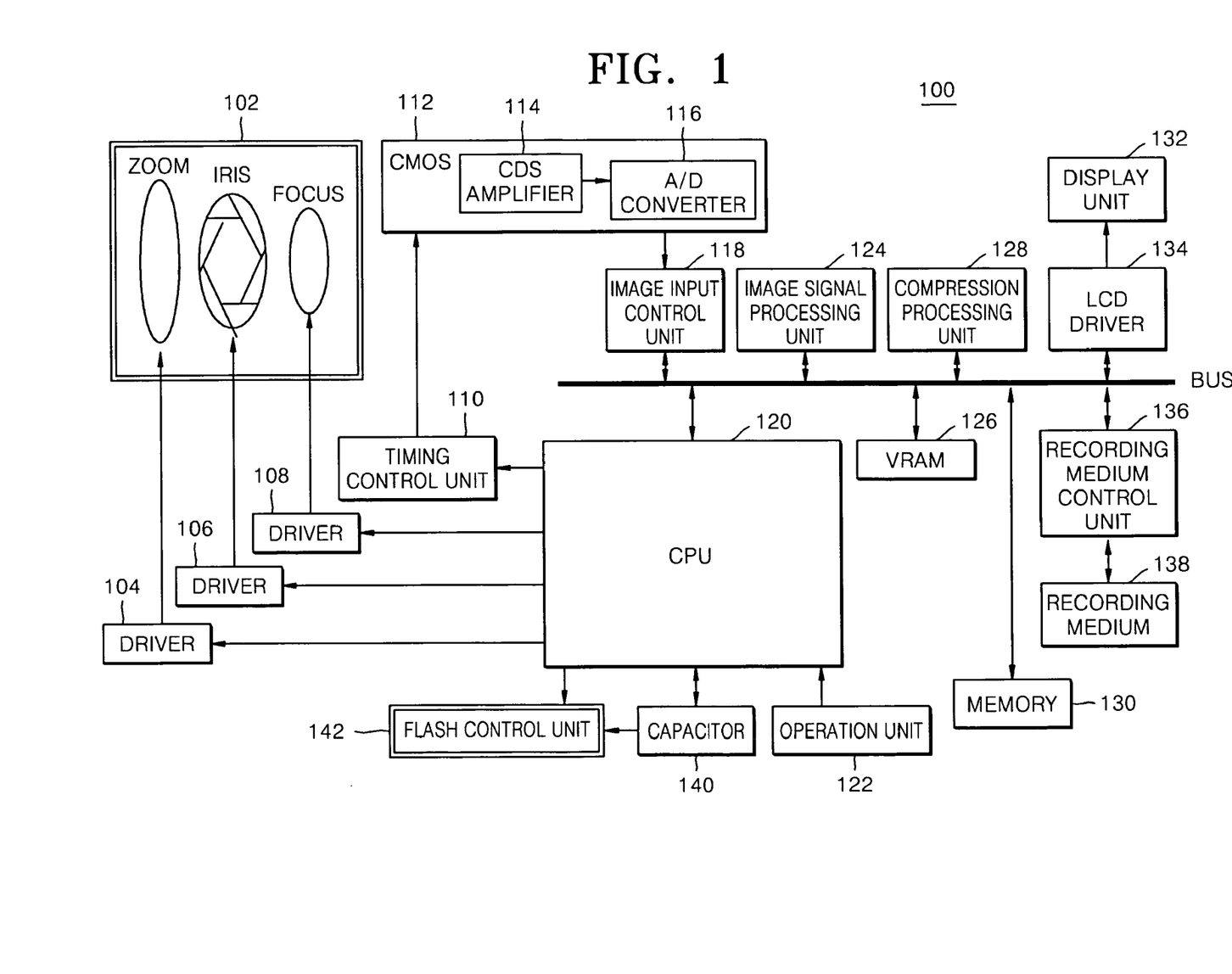
FIG. 1 is a block diagram illustrating an exemplary configuration of a photographing apparatus according to an embodiment of the present invention.

FIG. 1 is a block diagram illustrating a configuration of a photographing apparatus according to an embodiment of the present invention. As shown, the photographing apparatus 100, such as a still camera or movie camera, in this example includes an optical system 102, drivers 104, 106, and 108, a timing control unit 110, a complementary metal oxide semiconductor (CMOS) 112, a correlated double sampling (CDS) amplifier 114, an analog to digital (A/D) converter 116, and an image input control unit 118. The photographing apparatus 100 in this example further includes a central processing unit (CPU) 120, an operation unit 122, an image signal processing unit 124, a video random access memory (VRAM) 126, a compression processing unit 128, a memory 130, a display unit 132, a liquid crystal display (LCD) driver 134, a recording medium control unit 136, a recording medium 138, a capacitor 140, and a flash control unit 142.

The optical system 102 sets an image of an object on the CMOS 112 through the lenses of the optical system. The driver 104 drives a zooming tool of the optical system 102, the driver 106 drives an iris tool of the optical system 102, and the driver 108 drives a focusing tool of the optical system 102. The timing control unit 110 controls the exposing time or charge readout by each of the pixels that constitute the CMOS 112.

The CMOS 112 in this example is formed of photoelectric transducers and generates electrical signals according to light received by each of the photoelectric transducers. The CDS amplifier 114 removes low frequency noise included in the electrical signals received from the CMOS 112 and amplifies the electrical signals to a predetermined level. The A/D converter 116 converts an analog signal to a digital signal. The image input control unit 118 controls the operations of the CMOS 112, the CDS amplifier 114, and the A/D converter 116 by receiving a command from the CPU 120.

The operation unit 122 comprises a power switch, a mode change means, and a shutter button, and enable as user to set a shutter speed or International Standards Organization (ISO) sensitivity. The VRAM 126 in this example is an image display memory having a plurality of channels so that an input of a display image and a display in the display unit 132 can be performed simultaneously. The compression processing unit 128 compresses input image data to a Joint Photographic Experts Group (JPEG) compression type or a Lempel-Ziv-Welch (LZW) compression type.

The memory 130 can be a semiconductor memory device, such as a synchronous dynamic random access memory (SDRAM), and stores a high speed shutter image photographed with time division photographing. Also, a combined image that is combined by the image signal processing unit 124 and an operation program for the CPU 120 can be stored in the memory 130. The display unit 132 comprises a display element such as an LCD, where an image readout from the VRAM 126 can be displayed. The LCD driver 134 drives the display unit 132 and controls an output of the display unit 132.

The recording medium control unit 136 controls the input of image data to the recording medium 138, or reading of the image data or set information recorded in the recording medium 138. The recording medium 138 can be an optical recording medium, an optical magnetic disk, a magnetic disk, a semiconductor memory medium, or any other suitable medium, and can record photographed image data. Also, the recording medium 138 can be attachably and detachably configured to and from a corresponding photographing apparatus 100.

The capacitor 140 temporarily stores a current to ensure the power required to shoot a flash. The flash control unit 142 controls the shooting of a flash. In particular, the flash control unit 142 controls the flash operation in connection with entirely resetting the photographing device and an open-close operation of a mechanical shutter of the photographing apparatus 100.

Figure 2:
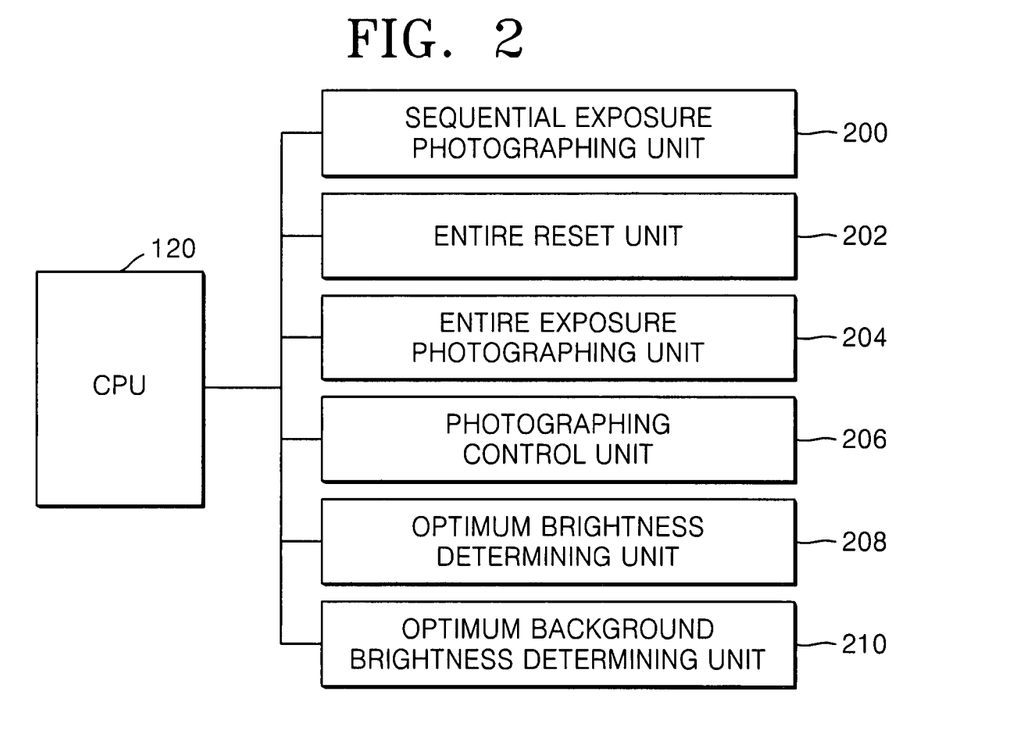
FIG. 2 is a block diagram illustrating an example of the functions of a CPU of the photographing apparatus illustrated in FIG. 1, according to an embodiment of the present invention.

FIG. 2 is a block diagram illustrating an example of a configuration of the functions of the CPU 120 of the photographing apparatus 100 illustrated in FIG. 1, according to an embodiment of the present invention. Referring to FIG. 2, the CPU 120 includes a sequential exposure photographing unit 200, an entire reset unit 202, an entire exposure photographing unit 204, a photographing control unit 206, an optimum brightness determining unit 208, and an optimum background brightness determining unit 210. That is, the CPU 120 can perform the above functions, or each of the units of the CPU 120 can be configured to an independent hardware block.

The sequential exposure photographing unit 200 takes a photograph in a rolling shutter mode in which an exposure is performed in a direction on each line of a photographing device. After the exposing is performed for a predetermined time, accumulated charges are readout in one direction from the point where the exposure begins. The entire reset unit 202 removes all charges accumulated on each pixel of the photographing device.

The entire exposure photographing unit 204 photographs in a global shutter mode, such that right after the charges accumulated in the photographing device are removed by the entire reset unit 202, the mechanical shutter of the photographing device is opened so that the entire pixels of the photographing device can be simultaneously exposed. After a predetermined exposure time, accumulated charges in each of the pixels of the photographing device are readout at the same time as the predetermined exposure time ends.

The photographing control unit 206 controls the sequential exposure photographing unit 200, the entire exposure photographing unit 204, and an image combining unit 306 (referring to FIG. 3) which will be described later, and controls the timing of photographing a sequential exposure image or an entire exposure image. Also, the photographing control unit 206 determines whether sequential exposure photographing is to be continued according to the brightness of a main object included in the combined image or background brightness.

The optimum brightness determining unit 208 determines whether the brightness of a main object detected in the photographed image is appropriate by comparing the brightness to a predetermined brightness of the main object. The optimum background brightness determining unit 210 determines whether the brightness of the background detected in the photographed image is appropriate by comparing the brightness of the background to a predetermined brightness of background.

Figure 3:
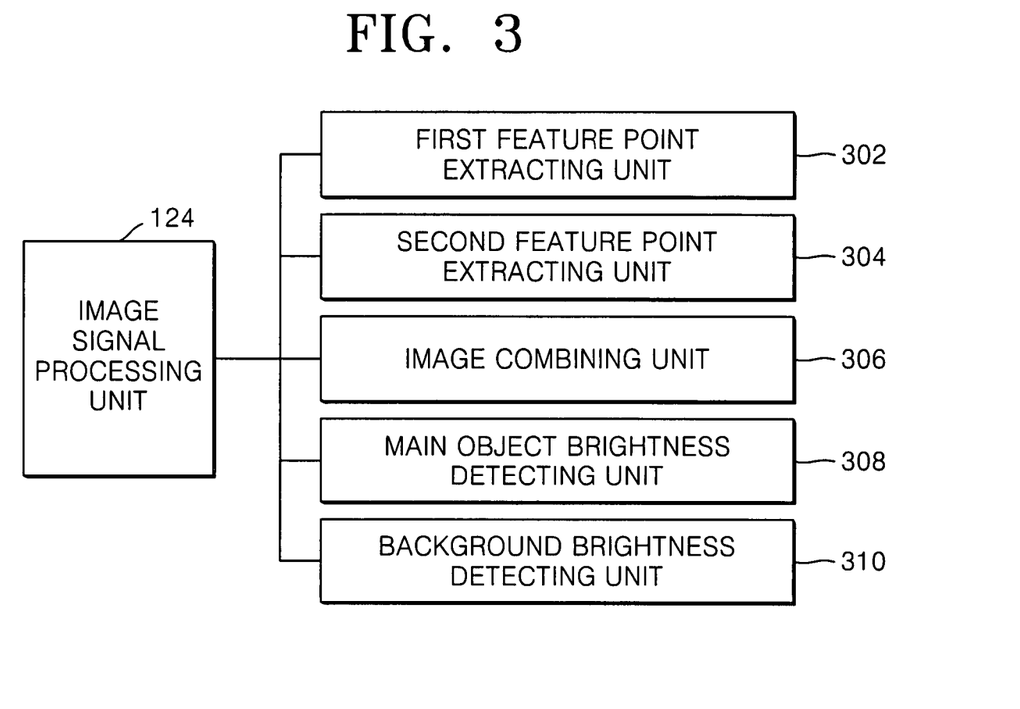
FIG. 3 is a block diagram illustrating an exemplary configuration of an image signal processing unit of the photographing apparatus illustrated in FIG. 1, according to an embodiment of the present invention.

FIG. 3 is a block diagram illustrating an example of a configuration of the image signal processing unit 124 of the photographing apparatus illustrated in FIG. 1, according to an embodiment of the present invention. The image signal processing unit 124 includes a first feature point extracting unit 302, a second feature point extracting unit 304, the image combining unit 306, a main object brightness detecting unit 308, and a background brightness detecting unit 310. Also, the image signal processing unit 124 calculates an evaluated value of an exposure amount set by automatic exposure (AE) and calculates an evaluated value of a focus distance set by automatic focus (AF).

The first feature point extracting unit 302 extracts a first feature point based on edge information of an entire exposure image, and the second feature point extracting unit 304 extracts a second feature point based on edge information of a sequential exposure image. If a brightness value of each pixel of each image is detected, information such as a corresponding brightness difference may be used to identify the edge of the image since an edge portion is where the corresponding brightness difference between adjacent pixels is the largest.

The image combining unit 306 generates a combined image by combining the entire exposure image and the sequential exposure image. The main object brightness detecting unit 308 detects the brightness of a main object included in the combined image. The background brightness detecting unit 310 detects the brightness of a background of the combined image.

The main object brightness detecting unit 308 or the background brightness detecting unit 310 can function as a part of an exposure amount detecting unit that detects the amount of exposure of the combined image. Of course, the exposure amount detecting unit can calculate a base brightness for determining a very high or too low overall amount of exposure with reference to both the brightness of the main object and the brightness of the background, for example, and can calculate an average value or a median value.

A photographing apparatus according to an embodiment of the present invention has been described above. The following describes a method of photographing using, for example, the photographing apparatus according to an embodiment of the present.

Figure 4:
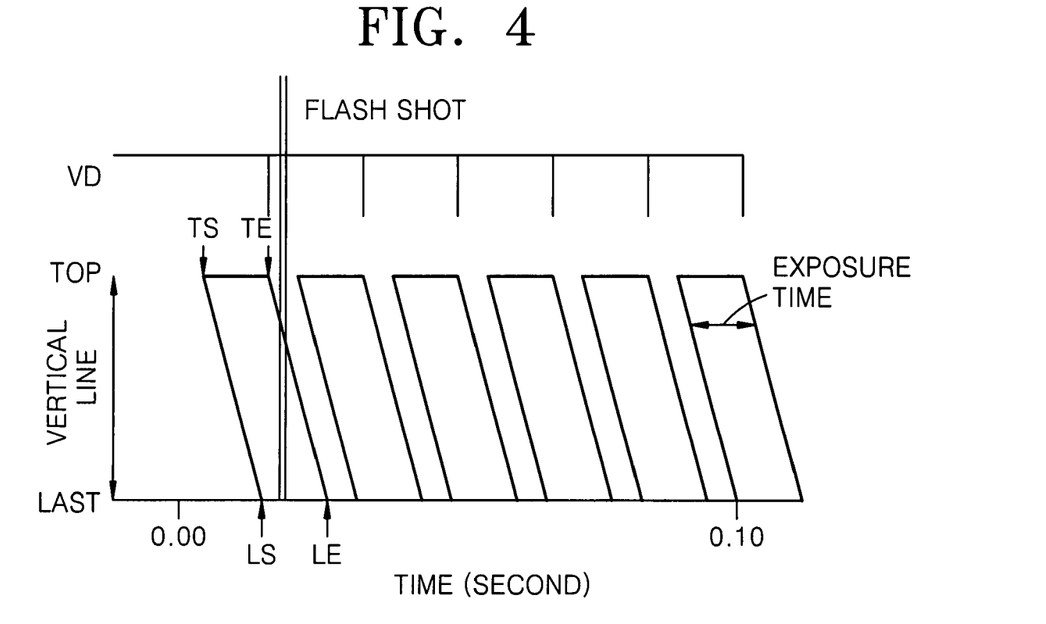
FIG. 4 illustrates a conceptual drawing of an example of exposure timing of a rolling shutter, according to an embodiment of the present invention.

FIG. 4 illustrates a conceptual drawing of an example of exposure timing of a rolling shutter, according to an embodiment of the present invention. In FIG. 4, VD indicates a vertical transmitting time. The vertical axis corresponds to vertical line positions of the photographing device, and the horizontal axis indicates time lapses. The exposure operation information is expressed by a concurrent quadrilateral having corners at TS, TE, LS, and LE, which will now be described specifically with reference to corresponding drawings.

Conventionally, a rolling shutter begins TS exposure from an upper end TOP of a vertical line to a lower end LAST of the vertical line, and when the exposure is completed, another exposure is performed from the upper end TOP to the lower end LAST of the vertical line. Also, after a predetermined time from the beginning of the exposure, charges accumulated in each pixel of the photographing device are readout from TE to LE. At this time, a time difference between the exposure beginning time and the readout beginning time of each line is considered an exposure time.

FIG. 4 illustrates when a flash is shot during an exposure. The flash shooting time is shown in vertical double lines. In the case of a rolling shutter having a short exposure time as depicted in FIG. 4, even when the flash is shot, the flash shooting time is not included in the exposure time of the TOP line. Therefore, an image data readout does not include the flash. Accordingly, to receive the flashlight to the entire line, a longer exposure time is set.

Figure 5:
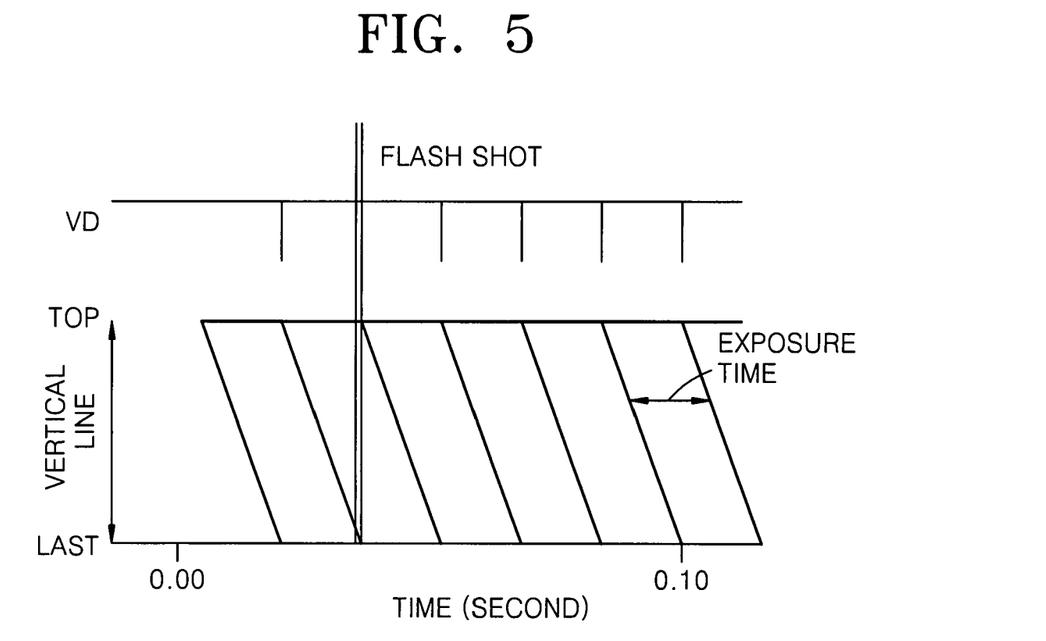
FIG. 5 illustrates a conceptual drawing of another example of the exposure timing of a rolling shutter.

An example of exposure timing of a rolling shutter that has an extended exposure time so that the entire line of a photographing pixel can receive the flash is illustrated in FIG. 5. As shown, an exposure timing in which the entire line can receive the flash can be achieved by appropriately controlling the shooting time of the flash to ensure a sufficiently long exposure time. However, such a low speed shutter with the sufficiently long exposure time can be easily affected by shaking.

Figure 6:
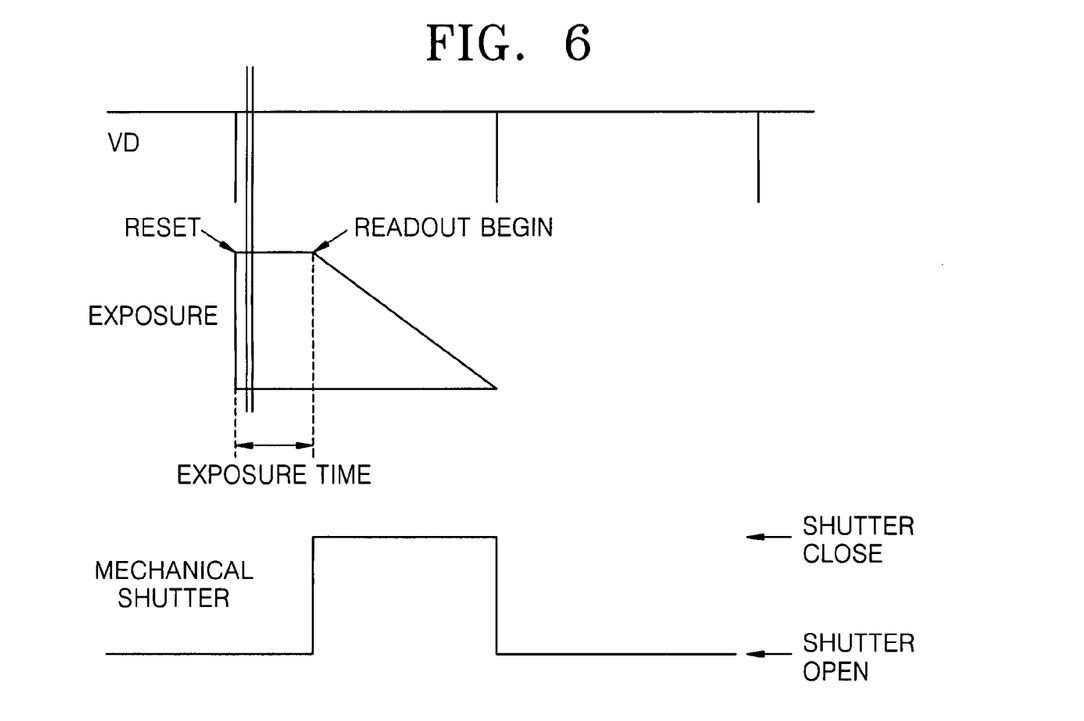
FIG. 6 illustrates a conceptual drawing of an example of exposure timing in an entire-reset mode.

Therefore, in slow synchronized photographing, a global shutter mode in which an entire reset mode and a mechanical shutter are jointly used, as depicted in FIG. 6, may be desirable. The global shutter mode is a mode in which an exposure begins after the charges from the upper end row (TOP) and to the lower end row (LAST) of a line is entirely reset. Since readout begins from the upper end row (TOP) after the exposure, in a vertical direction of an image, there is an exposure time difference. However, the same exposure time of the entire line can be achieved by shielding incident light through the use of the mechanical shutter. In this way, by using the entire reset mode and the mechanical shutter, the shutter speed can be maintained at a high speed within a range such that the exposure time is not less than the flash shooting time. Therefore, the entire line can be exposed simultaneously.

Figure 7:
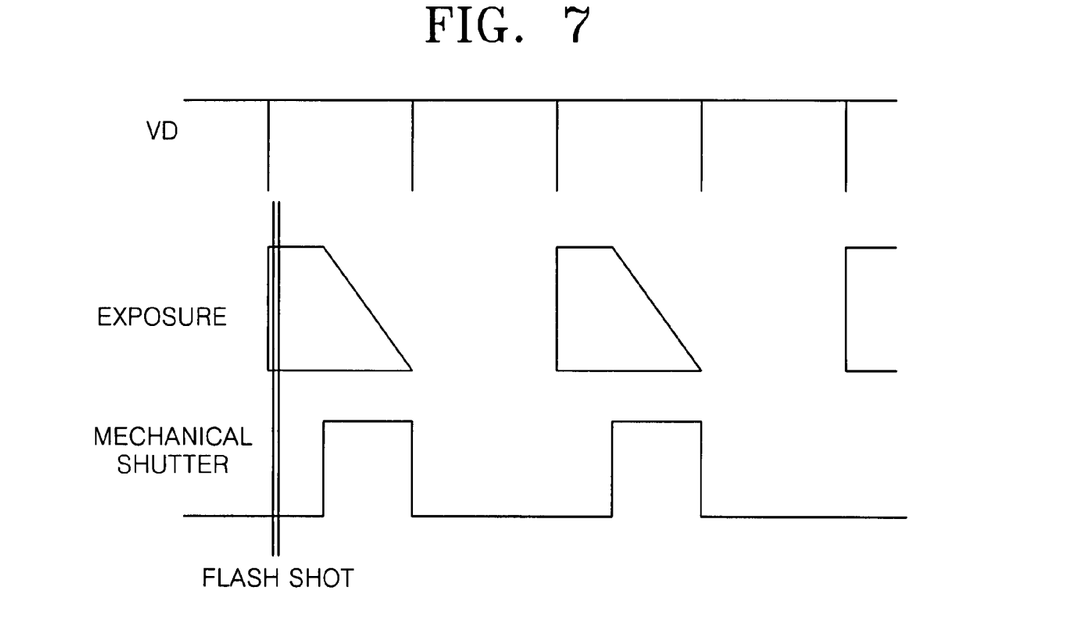
FIG. 7 illustrates a conceptual drawing of another example of a continuous exposure timing in an entire-reset mode.

In general, a shutter speed that can cause shaking is longer than the time of an inverse focal distance (e.g., in mm) when the focal distance is for a 35 mm film camera. For example, if a focal distance is 200 mm, the shutter speed that can cause the image to be readily affected by shaking is longer than $\frac{1}{200}$ of a second. Also, a high speed shutter is used since shaking can readily occur when using a zooming function. The entire reset mode can thus be more effective than the rolling shutter mode in reducing the effect of shaking on the image. However, the entire reset mode can produce an operation sound due to movement of a mechanical shutter. Also, in the entire reset mode, an exposure for the next image does not occur until the shutter is completely opened from a closed state. Accordingly, as depicted in FIG. 7, there are time lags for each photographing in a continuous photographing mode. Therefore, a photographing apparatus according to an embodiment of the present invention uses the entire reset mode when photographing a main object with a flash, and uses the rolling shutter mode when photographing a background without a flash.

Figure 8:
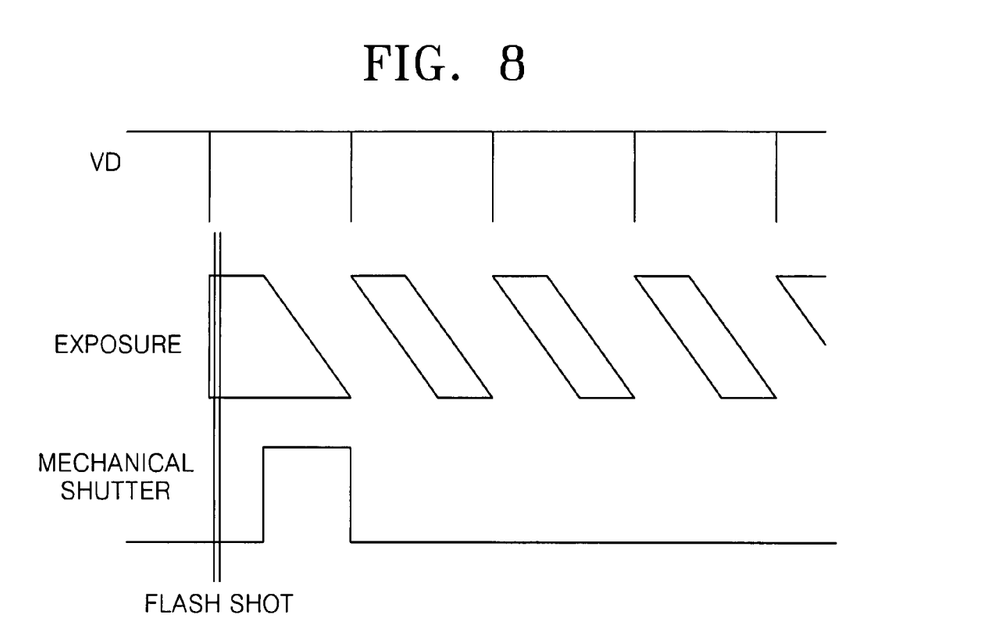
FIG. 8 illustrates a conceptual drawing of an example of an exposure timing of a photographing apparatus according to an embodiment of the present invention.

The exposure timing of a photographing apparatus according to an embodiment of the present embodiment will now be described with reference to FIG. 8, which illustrates a conceptual drawing of an example of exposure timing of a photographing apparatus.

After photographing is performed using the entire reset mode, photographing is performed using the rolling shutter, that is, a plurality of images are photographed. Also, the flash is shot right after the mechanical shutter opens. When a predetermined exposure time passes, the mechanical shutter closes, and accumulated charges in a line are sequentially readout from the upper end TOP of the line of a photographing device. Since the opening and closing of the mechanical shutter is performed in the first photographing, the photographer is not interrupted due to the operation sound of the mechanical shutter. Also, when photographing using the rolling shutter, the mechanical shutter need not be used. Accordingly, a time lag due to opening and closing of the mechanical shutter does not occur in a continuous photographing mode.

Figure 9:
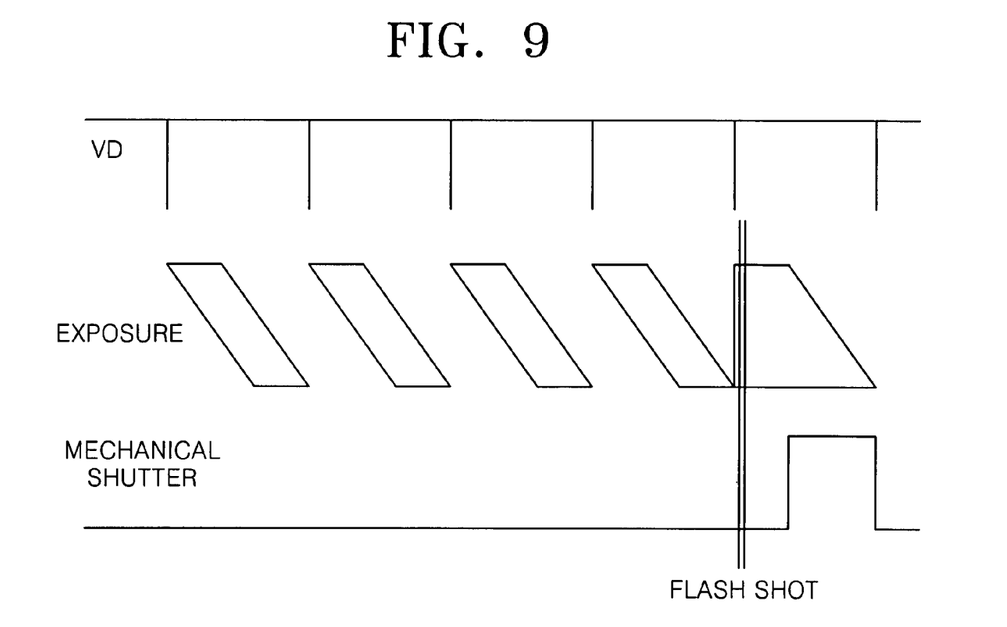
FIG. 9 illustrates a conceptual drawing of an example of a modified exposure timing of a photographing apparatus according to an embodiment of the present invention.

According to an embodiment of the present embodiment, the timing for shooting a flash occurs once in the entire reset mode. This can prevent or reduce the possibility that the flash will cause an exposure stain when photographing in the rolling shutter mode. Furthermore, as depicted in FIG. 9, the photographing using the entire reset mode can be performed at the end.

The speed of the rolling shutter is greater than the shutter speed that can be able to obtain an appropriate exposure, and may be set so that a brightness of an image combined from predetermined images photographed at a corresponding high shutter speed is equal to the brightness of an appropriately exposed image. In some cases, an image photographed at the high shutter speed is displayed in terms of the time division images. Photographing by the time division exposure mode may denote photographing using the high speed shutter.

As described above, a photographing apparatus according to an embodiment of the present invention first photographs a foreground image in an entire reset mode, and then photographs a background image using the rolling shutter in a continuous photographing mode. Afterwards, a feature point is extracted in each photographed image based on edge information of each photographed image.

Also, a combined image is produced from a photographed image in the entire reset mode, and a plurality of images photographed using the rolling shutter so that the position of the corresponding feature point is aligned. Here, the number of continuous shots by the rolling shutter mode may be determined, for example, based on the brightness value of the combined image. The number of continuous shots may be preset to predetermined shots, or alternately, may be appropriately controlled by the photographer.

Feature points of each image are extracted whenever the image is photographed. By aligning the positions of the feature points, the images which are photographed by in the rolling shutter mode are combined. Accordingly, the brightness value of the combined image is sequentially monitored since the combined image is generated whenever the image is photographed using the rolling shutter mode.

The brightness value monitored whenever the corresponding brightness value is detected is compared to a predetermined appropriate brightness value to determine whether a continuous photographing is to be continued. The brightness of a combined image can be, for example, a brightness value of a main object or a brightness value of an entire image region including a background portion. The brightness value can be a peak value or a mean value of the whole object. Hereinafter, the combined image that results by combining the images in every photographing session can be referred to as a live view image.

A brightness value monitoring function will now be described.

If a main object, for example, a human, is far away from a background, a flash does not reach the background. In this case, even though photographing shots are determined by monitoring a brightness value of the background image, the exposure amount for a combined image can be used. However, if the main object is close to the background, the flash reaches the background. In this case, when the image of the main object photographed in an entire reset mode is combined with the background image, the image of the main object likely has a brightness level of over exposure.

Also, when photographing in a situation where brightness is continuously changing, the monitored brightness value does not represent the true brightness of the object. Also, when normal light is illuminated on both the main object and the background, and a brightness difference between the main object and the background is small, some of the exposure of the background is added to the main object in addition to the normal light while the background is exposed. As a result, the brightness level of the main object in a combined image can greatly increase. Accordingly, it is desirable to control of exposure level according to the situation.

Figure 10:
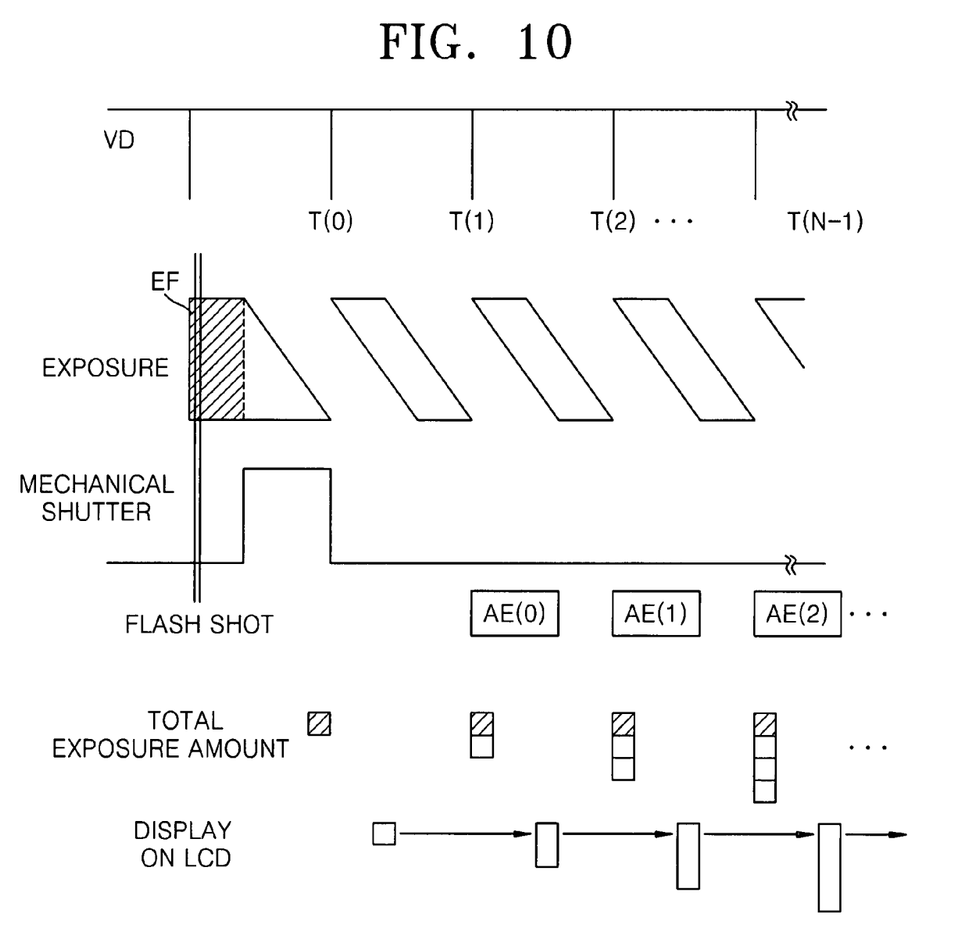
FIG. 10 illustrates a schematic drawing of an example of an exposure time and the exposure amount of a photographing apparatus according to an embodiment of the present invention.

The brightness value monitoring function of a photographing apparatus according to an embodiment of the present invention will now be described with reference to FIG. 10. FIG. 10 is a schematic drawing illustrating a method of continuous photographing by monitoring an amount of exposure using a rolling shutter mode after first photographing in an entire mode.

In Equation 1, B is an exposure level of a background portion calculated at the brightness of a live view image. Also, T(k) is a shutter speed that does not generate shaking when a background is photographed, where k=0, 1, . . . N−1 (N is natural number). N is the number of shots, and the number of shots N are determined so that an appropriate level of exposure amount can be obtained after N' times exposure. A, a fixed value, is an iris value, and EF is an exposure amount when photographing is performed in the entire reset mode.

$$B = \sum_{k=0}^{N-1} \{T(k) \times A\} + EF \ldots \quad \text{[Equation 1]}$$

The automatic exposure (AE) calculation is performed to predict the future brightness level while monitoring the brightness level of combined images. Also, in performing the AE calculation, the brightness level is confirmed whenever an image is combined from each of the photographed images, and a main object and a background part are confirmed depending on whether each of the main object and the background is over exposed. Furthermore, the AE calculation is performed after a readout operation that is performed right after the lower end of the line is exposed. In FIG. 10, AE(k) is the AE calculation performed with respect to a photographed image in the kth shot using the rolling shutter.

For example, for AE(1), when the AE calculation with respect to the first rolling shutter photographing is performed, the next exposure T(2) has already started. Accordingly, if an anticipated brightness level, to which a shutter speed information of T(2) is applied, is expected to reach a desired brightness level, the T(3) exposure is cancelled. As a result, photographing can be performed with a stable exposure level. Furthermore, for AE(N−2), if an exposure amount, to which a shutter speed T(N−1) of a final exposure is applied, is determined as deficient, the number of exposures can be increased.

However, after an exposure is performed by the entire reset mode, the location and size of a main object are detected by measuring an amount of reflected light of the flash. Also, in performing an AE calculation while exposing using the rolling shutter mode, a brightness level of the main object is determined. That is, the brightness value of the main object is monitored so that the brightness value is not excessively large by the addition of the normal light portion. Also, as a basis of cancelling exposure, the brightness value of the main object is primarily used, and when the brightness value of the main object is appropriate, the brightness value of the background is then used.

The lowermost line in FIG. 10 illustrates an example of the timing and brightness value of a combined image displayed in a display unit such as a LCD. The display image becomes brighter since an image of the background is added. This phenomenon can be observed in the LCD.

Also, when the photographer presses a shutter-button for more than a predetermined number of times, the photographing apparatus changes into a bulb photographing mode. On the contrary, when the shutter button is released within a predetermined period of time, the photographing is performed by the AE calculation (T(0)–T(N−1)). In the bulb photographing mode, an exposure end time can be determined by the photographer while observing the brightness level of the combined image displayed on the LCD. Furthermore, in the bulb photographing mode, when the shutter button is released, the exposure ends. Of course, settings in the bulb photographing mode can be made in advance.

It should also be noted that a different sensitivity can be when photographing a main object in the entire reset mode by shooting a flash and when photographing a background in the rolling shutter mode. That is, when photographing a background in which image quality is not important, the photographing can be performed in high sensitivity, and when photographing a main object, the photographing can be performed in low sensitivity. The photographing in different sensitivities reduces the number of shots of the background and the need to photograph at a high speed. Also, in some cases, only one shot of the background may be sufficient.

As described above, a brightness level of a combined image can be appropriately controlled by determining whether photographing is continued according to detected brightness levels monitored in each photographing. Also, in the bulb photographing mode, the photographer can control the amount of exposure while observing the brightness level displayed on a display unit.

Figure 11:
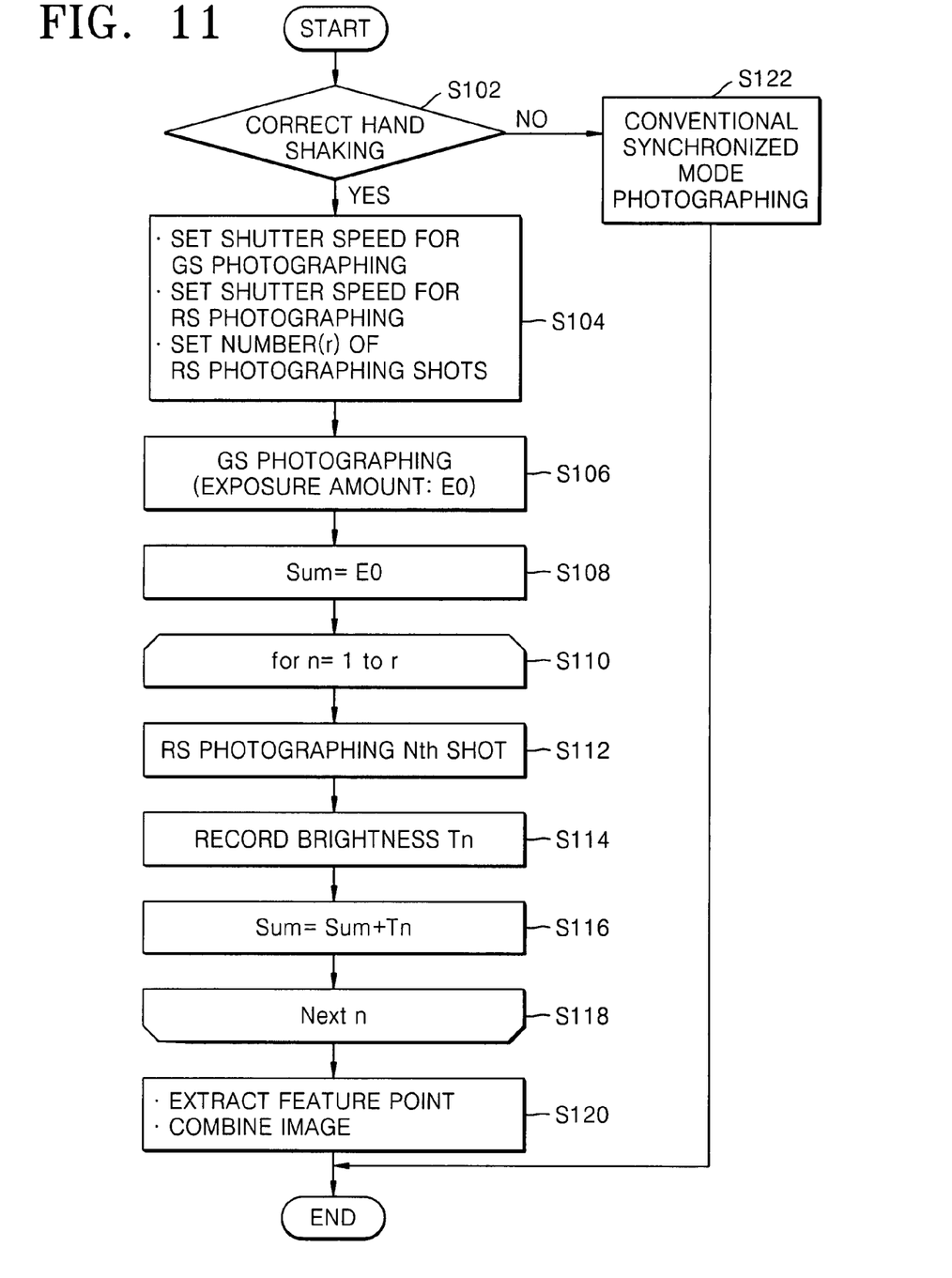
FIG. 11 illustrates a flowchart of an example of a method of photographing according to an embodiment of the present invention.

FIG. 11 illustrates a flowchart of an example of a method of photographing according to an embodiment of the present.

As indicated, the photographing apparatus detects in step S102 whether a shaking correction function is 'ON', and if the shaking correction function is not 'ON', photographing is performed in a conventional slow synchronized photographing mode in step S122.

If the shaking correction function is 'ON', the shutter speed of global shutter (GS) photographing by a global shutter (an entire reset mode) is set, the shutter speed of rolling shutter (RS) photographing by a rolling shutter is set, and the number of shots r for RS photographing is set, all in step S104.

Next, the GS photographing is performed based on the set shutter speed of GS photographing in step S106. That is, the photographing is performed in the entire reset mode. The exposure amount at this time is E0.

Also, the SUM exposure in which an exposure amount of each image is temporarily stored is initialized by the exposure amount E0 by GS photographing in step S108.

The nth (n=1~r) RS photographing is performed in step S112, and an exposure amount Tn of each RS photographed image is recorded in step S114. The recorded exposure amount Tn is added to the SUM exposure in step S116. This process from step S110 to step S118 is repeated as many as the set number of RS shots.

A first featuring point is detected from edge information of the first GS photographed image, and at the same time, second featuring points are detected from edge information of each of the RS photographed images in step S120. Also in step S120, the photographed images are combined to align the position of the first featuring point of the first GS photographed image and positions of the second featuring points of the corresponding images. In this process, a combined image, for which the exposure amount of which is appropriately controlled, is generated.

Figure 12:
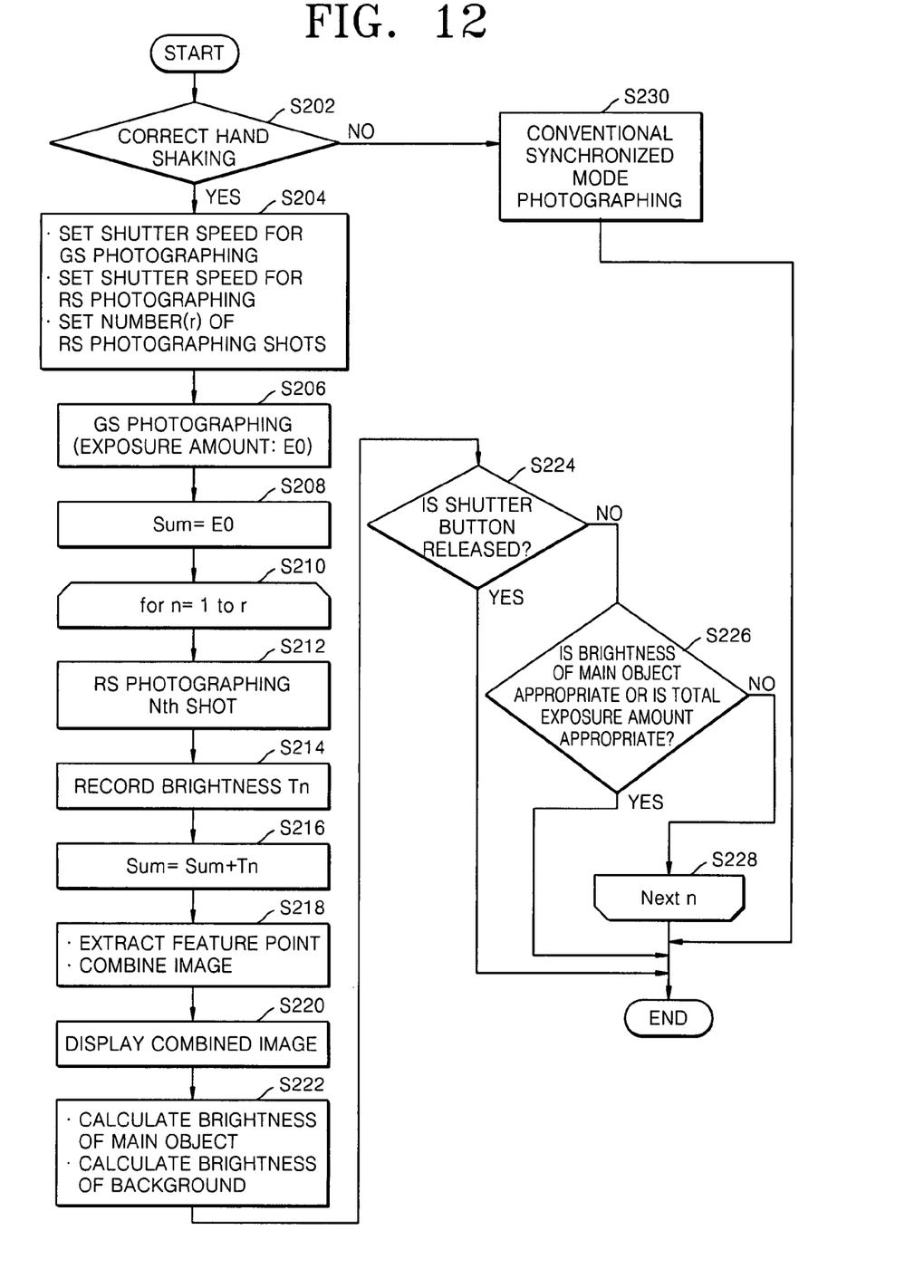
FIG. 12 illustrates a flowchart of an example of a method of photographing of a photographing apparatus in a bulb photographing mode, according to an embodiment of the present invention.

Next, a method of photographing using a photographing apparatus having a bulb photographing mode, by which an RS photographing can be stopped by automatically detecting an exposure amount, will now be described. FIG. 12 illustrates a flowchart of a method of photographing of a photographing apparatus having a bulb photographing mode, according to an embodiment of the present invention.

The photographing apparatus having the bulb photographing mode detects whether a shaking correction function is 'ON' in step S202. If the shaking correction function is not 'ON', photographing is performed in the slow synchronized photographing mode in step S230.

If the image stabilization function is 'ON', a shutter speed for GS photographing by the global shutter (an entire reset mode) is set, a shutter speed for RS photographing by the rolling shutter is set, and the number of shots r for RS photographing is set, all in step S204.

Next, GS photographing is performed based on the shutter speed set for the GS photographing in step S206. That is, the photographing is performed in the entire reset mode. The exposure amount at this time is E0. Also, a value of the SUM exposure, in which an exposure amount of each image is temporarily stored, is initialized by the exposure amount E0 for GS photographing in step S208.

The nth (n=1~r) RS photographing is performed in step S212, and an exposure amount Tn of each RS photographed image is recorded in step S214. Also, the recorded exposure amount Tn is added to the SUM exposure in step S216.

A first featuring point is detected from edge information of the first GS photographed image, and at the same time, second featuring points are detected from edge information of each of the RS photographed images in step S218. Also in step S218, the photographed images are combined to align the position of the first featuring point of the first GS photographed image and positions of the second featuring points of the corresponding images. Afterward, the combined image is displayed in step S220.

From the combined image, the exposure amount of a main object is calculated in step S222, and the exposure amount of a background included in the combined image is also calculated in step S222.

Afterward, the photographing apparatus detects whether a shutter button is released in step S224. If the shutter button is released within a predetermined time, processing stops and the combined image is determined. On the contrary, if the shutter button is not released within a predetermined time, the photographing apparatus detects whether the exposure amount of the main object or the total exposure amount is appropriate in step S226.

If the exposure amount of the main object or the total exposure amount is not appropriate, the processing for the RS photographing is continued in steps S210 through S228. However, if the exposure amount of the main object or the total exposure amount is appropriate, processing stops and the combined image is determined. To determine whether the total exposure amount is appropriate, the appropriateness of the exposure amount of the main object is examined in advance. If the exposure amount of the main object is found to be appropriate, the appropriateness of the exposure amount of the background is examined. That is, the appropriateness of the total exposure amount is determined after the appropriateness of the exposure amount of the main object and the exposure amount of the background are sequentially determined. Therefore, the RS photographing is repeated until the exposure amount of the main object is appropriate, and afterwards, the RS photographing is repeated until the exposure amount of the background is appropriate. In this case, the exposure amount of the main object is greater than an appropriate exposure level. Through the above processes, a combined image having an appropriate exposure amount is generated.

As described above, a photographing apparatus and method according to an embodiment of the present provide a shaking correction function in a slow synchronized photographing, as well as an exposure level control function with respect to a main object and a background.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing apparatus for combining a plurality of images photographed by time division exposure, comprising:

a photographing device having an entire reset mode in which an entirety of pixels are exposed after a flash is shot, and a sequential exposure mode in which exposure time is different according to a state where a flash is not shot; and an image combining unit that combines images photographed by the photographing device in the entire reset mode and the sequential exposure mode, wherein the photographing device performs photographing in the entire reset mode and the sequential exposure mode in sequential photographing operations.

2. The photographing apparatus of claim 1, wherein the photographing device photographs the plurality of images through a plurality of exposures by the sequential exposure mode in sequential photographing operations, and the image combining unit combines the plurality of images by removing a dislocation of an object included in the plurality of images.

3. The photographing apparatus of claim 1, wherein the image combining unit generates a combined image whenever an image is photographed by the photographing device by combining the image photographed by the photographing device, the photographing apparatus comprises an exposure amount detecting unit that detects the exposure amount of the combined image after the image is combined, and the photographing device stops photographing in the sequential exposure mode when the exposure amount of the combined image reaches a predetermined brightness level.

4. The photographing apparatus of claim 3, further comprising:

an optimum brightness determining unit for determining whether a brightness of a main object in the combined image is appropriate in relation to a predetermined brightness of the main object; and an optimum background brightness determining unit for determining whether a brightness of a background in the combined image is appropriate in relation to a predetermined brightness of background.

5. The photographing apparatus of claim 1, wherein the photographing device repeats photographing in the sequential exposure mode until a photographer stops photographing.

6. The photographing apparatus of claim 1, wherein:

in the entire reset mode, the entirety of pixels are exposed simultaneously immediately after the flash is shot.

7. The photographing apparatus of claim 1, wherein:

the sequential photographing operations are performed in a rolling shutter mode.

8. The photographing apparatus of claim 1, wherein:

the photographing device performs photographing in the entire reset mode and the sequential exposure mode in sequential photographing operations when a shaking correction function of the photographing apparatus is activated.

9. The photographing apparatus of claim 1, wherein:

the image combining unit combines the plurality of images based on a featuring point in the images.

10. The photographing apparatus of claim 1, wherein:

the photographing device photographs the images based on an automatic exposure calculations.

11. A method of photographing in which a plurality of images photographed by time division exposure can be combined, the method comprising:

performing a composite mode photographing process using an entire reset mode in which an entirety of pixels are exposed after a flash is shot and a sequential exposure mode in which exposure timing is different according to a state where a flash is not shot; and performing an image combining process by which images photographed in the composite mode photographing process using the entire reset mode and the sequential exposure mode are combined, wherein, in the composite mode photographing process, photographing is performed in the entire reset mode and the sequential exposure mode in sequential photographing operations.

12. The method of claim 11, wherein, in the composite mode photographing process, a plurality of images are photographed through a plurality of exposures by the sequential exposure mode in sequential photographing operations, and in the image combining process, the plurality of images are combined by removing dislocations of an object included in the plurality of images.

13. The method of claim 11, wherein, in the image combining process, a combined image is generated whenever an image is photographed by the photographing device by combining the image photographed by the photographing device, the method of photographing comprises an exposure amount detecting process by which the exposure amount of the combined image is detected after the image is combined, and in the composite mode photographing process, photographing stops in the sequential exposure mode when the exposure amount of the combined image reaches a predetermined brightness level.

14. The method of claim 13, further comprising:

determining whether a brightness of a main object in the combined image is appropriate in relation to a predetermined brightness of the main object; and determining whether a brightness of a background in the combined image is appropriate in relation to a predetermined brightness of background; and the exposure amount of the combined image is determined to have reached the predetermined brightness level when the brightness of the main object in the combined image and the brightness of the background in the combined image are both determined to be appropriate.

15. The method of claim 11, wherein, in the composite mode photographing process, the photographing in the sequential exposure mode is repeated until a photographer stops photographing.

16. The method of claim 11, wherein:

in the entire reset mode, the entirety of pixels are exposed simultaneously immediately after the flash is shot.

17. The method of claim 11, wherein:

the sequential photographing operations are performed in a rolling shutter mode.

18. The method of claim 11, wherein:

the composite mode photographing process in the entire reset mode and the sequential exposure mode are performed when a shaking correction function of the photographing apparatus is activated.

19. The method of claim 11, wherein:

the image combining process combines the plurality of images based on a featuring point in the images.

20. The method of claim 11, wherein:

the composite mode photographing process photographs the images based on an automatic exposure calculations.

* * * * *